US009826548B2

(12) United States Patent
Tayamon et al.

(10) Patent No.: US 9,826,548 B2
(45) Date of Patent: Nov. 21, 2017

(54) STATION, AN ACCESS POINT AND METHODS THEREIN FOR HANDLING TRANSMISSIONS IN A WIRELESS COMMUNICATIONS NETWORK

(71) Applicant: Telefonaktiebolaget L M Ericsson (publ), Stockholm (SE)

(72) Inventors: Soma Tayamon, Stockholm (SE); Gustav Wikström, Täby (SE); Johan Söder, Stockholm (SE); Yu Wang, Solna (SE); Filip Mestanov, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 58 days.

(21) Appl. No.: 14/758,420

(22) PCT Filed: Jun. 5, 2015

(86) PCT No.: PCT/SE2015/050658
§ 371 (c)(1),
(2) Date: Jun. 29, 2015

(87) PCT Pub. No.: WO2016/195561
PCT Pub. Date: Dec. 8, 2016

(65) Prior Publication Data
US 2016/0360549 A1 Dec. 8, 2016

(51) Int. Cl.
*H04W 56/00* (2009.01)
*H04W 72/04* (2009.01)
*H04W 72/12* (2009.01)
*H04W 74/08* (2009.01)
*H04W 84/12* (2009.01)

(52) U.S. Cl.
CPC ... *H04W 72/1284* (2013.01); *H04W 56/0005* (2013.01); *H04W 56/0035* (2013.01);
(Continued)

(58) Field of Classification Search
CPC ......... H04W 56/0005; H04W 56/0035; H04W 72/04–72/0433;
(Continued)

(56) References Cited

U.S. PATENT DOCUMENTS

2002/0071448 A1 6/2002 Cervello et al.
2006/0221999 A1* 10/2006 Bachrach .......... H04W 74/0816
370/465

(Continued)

FOREIGN PATENT DOCUMENTS

WO WO 2014/186939 A1 11/2014
WO WO 2015/006637 A1 1/2015
(Continued)

OTHER PUBLICATIONS

International Search Report and Written Opinion of the International Searching Authority, Application No. PCT/SE2015/050658, Feb. 3, 2016.
(Continued)

*Primary Examiner* — Timothy J Weidner
(74) *Attorney, Agent, or Firm* — Sage Patent Group

(57) ABSTRACT

Embodiments herein relate to a first station (STA1) and a method performed by a first station (STA1) for handling Request-to-Send/Clear-to-Send, RTS/CTS, transmissions in a wireless communications network (100). The first station (STA1) is served by a first access point (AP1) in a first Basic Service Set (BSS1). The first station (STA1) receives a RTS/CTS transmission relating to a second Basic Service Set (BSS2). Then, the first station (STA1) determine whether or not to set a Network Allocation Vector, NAV, according to the RTS/CTS transmission based on whether the RTS/CTS transmission was sent from a second station (STA2) or from a second access point (AP2) in the second Basic Service Set (BSS2).
Embodiments herein also relate to a first access point (AP1) and a method performed by a first access point (AP1) for handling RTS/CTS transmissions in a wireless communications network (100).

17 Claims, 6 Drawing Sheets

(52) U.S. Cl.
CPC ... *H04W 72/0406* (2013.01); *H04W 74/0816*
(2013.01); *H04W 84/12* (2013.01)

(58) Field of Classification Search
CPC ..................... H04W 72/1278–72/1294; H04W
74/08–74/0858; H04W 84/12
See application file for complete search history.

(56) References Cited

U.S. PATENT DOCUMENTS

| | | | |
|---|---|---|---|
| 2010/0329178 | A1 | 12/2010 | Cordeiro |
| 2015/0312386 | A1* | 10/2015 | Lee .......................... H04L 69/22 370/338 |

FOREIGN PATENT DOCUMENTS

| | | |
|---|---|---|
| WO | WO 2015/035946 A1 | 3/2015 |
| WO | WO 2015/066343 A1 | 5/2015 |

OTHER PUBLICATIONS

Park et al., "Enhancement on resource utilization in OBSS Environment", retrieved from https://mentor.ieee.org/802.11/dcn/13/11-13-1056-01-0hew-enhancement-on-resource-utilization-in-obss-enviroment.ppt, IEEE 802.11-13/1056r1, Sep. 16, 2013, 12 pp.

IEEE Computer Society, "IEEE Standard for Information Technology—Telecommunications and Information exchange between systems—Local and metropolitan area networks—Specific Requirements—Part 11: Wireless LAN Medium Access Control (MAC) and Physical Layer (PHY) specifications: Amendment 4: Enhancements for Very High Throughput for Operation in Bands below 6 GHz", IEEE Standard 802.11ac™-2013 (Amendment to IEEE Std 802.11™-2012,as amended by IEEE Std 802.11ae™-2012, IEEE Std 802.11aa™-2012, and IEEE Std 801.11ad™-2012), 425 pp.

Zhao et al., "Novel RTS/CTS Procedure", Submission doc.: IEEE 11-14/1381r0, Oct. 2014, 6 pp.

Zhao et al., "Novel RTS/CTS Procedure", Submission doc.: IEEE 11-14/1381r1, Oct. 2014, 6 pp.

* cited by examiner

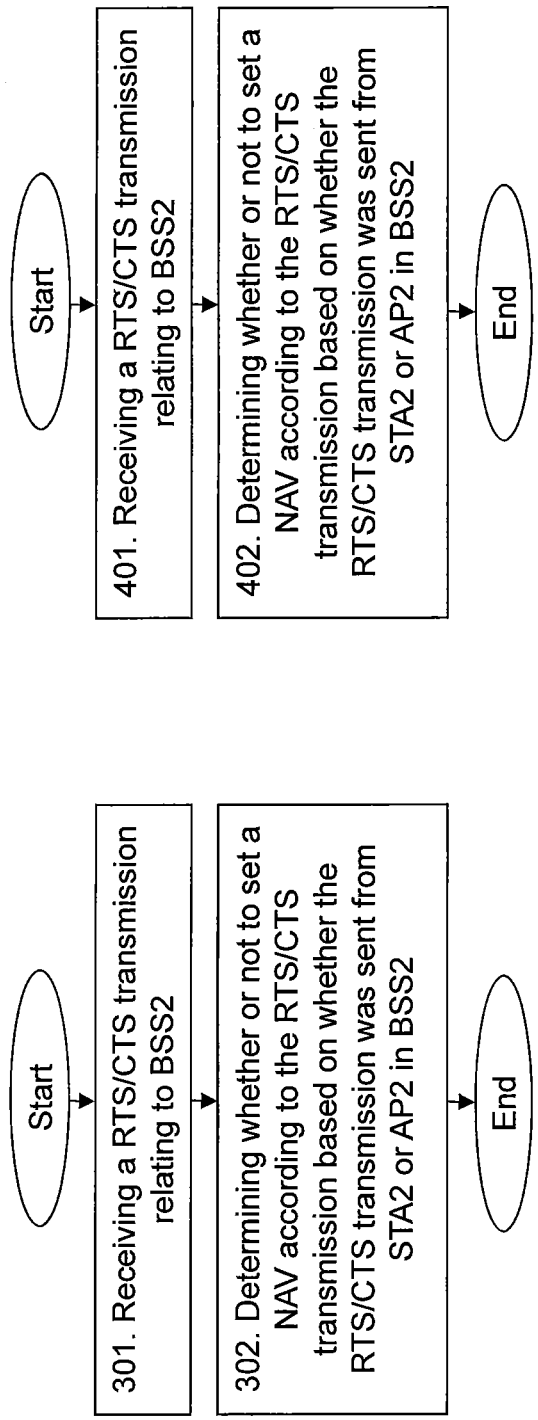

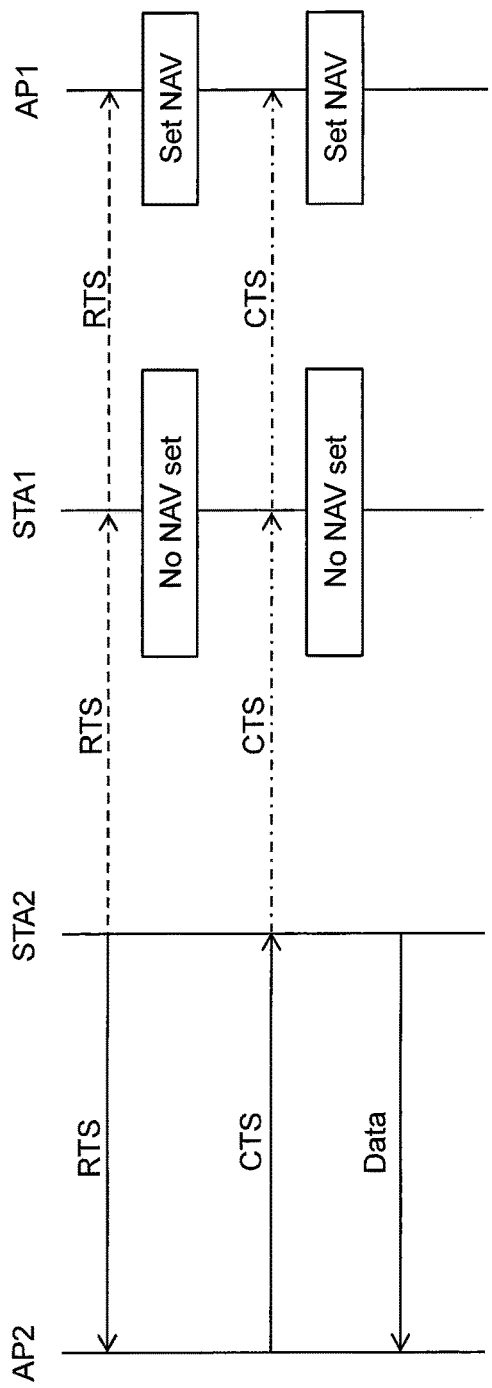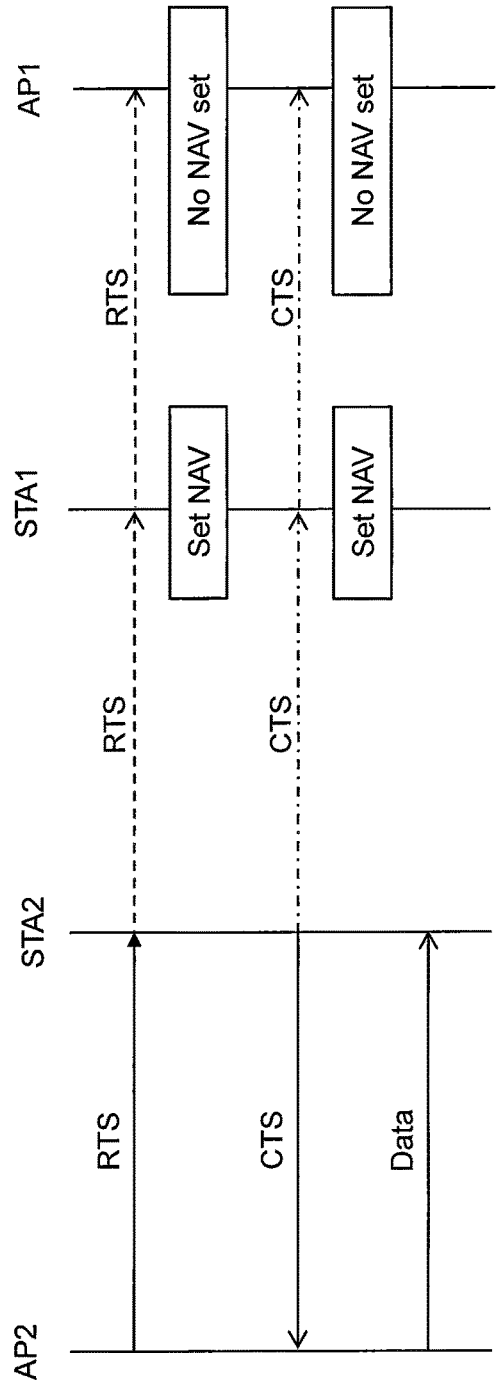
Fig. 5
Fig. 6

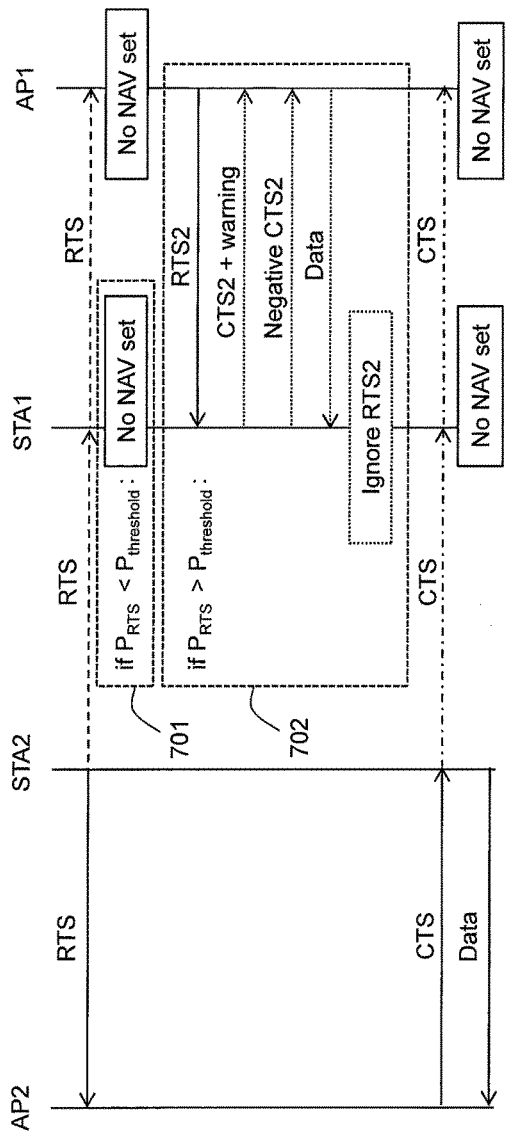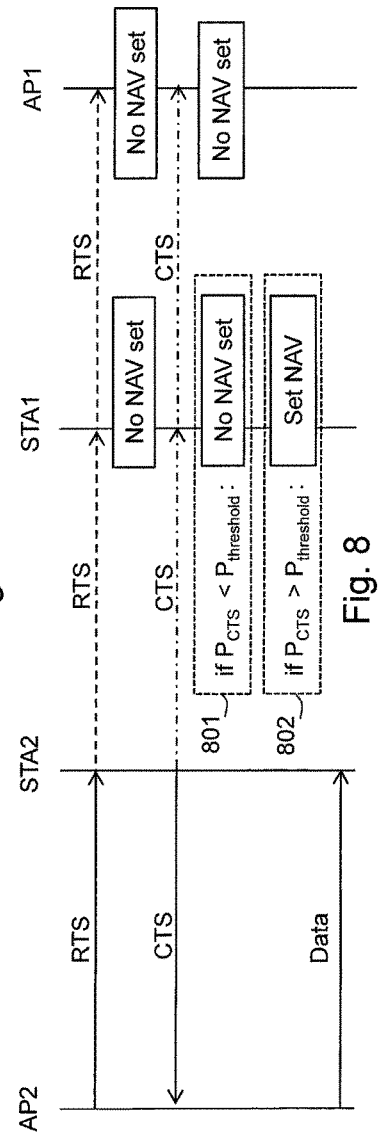
Fig. 7
Fig. 8

STATION, AN ACCESS POINT AND METHODS THEREIN FOR HANDLING TRANSMISSIONS IN A WIRELESS COMMUNICATIONS NETWORK

CROSS REFERENCE TO RELATED APPLICATION

This application is a 35 U.S.C. § 371 national stage application of PCT International Application No. PCT/SE2015/050658, filed on 5 Jun. 2015, the disclosure and content of which is incorporated by reference herein in its entirety.

TECHNICAL FIELD

Embodiments herein relate to transmissions in a wireless communications network. In particular, embodiments herein relate to a station, an access point and methods therein for handling Request-to-Send, RTS, transmissions in a wireless communications network.

BACKGROUND

One example of a wireless communications network using contention-based transmission resources of the same frequency is the standardized IEEE 802.11 Wireless LAN, WLAN. Here, a Basic Serving Set, BSS, is regarded the basic building block of the wireless communications network. The BSS comprise an Access Point, AP, and a number of stations, STAs, located within a certain coverage area or cell being served by the AP. Within a BSS, the transmission between the AP and the STAs is typically performed in a distributed manner. This means that before a transmission, a STA first performs a sensing of the transmission medium for a specific period of time, e.g. a Clear Channel Assessment, CCA. If the transmission medium is deemed idle, e.g. received signal power is below a threshold, then access is assigned to this STA for transmission. On the other hand, if the transmission medium is deemed occupied, e.g. received signal power is above the threshold, the STA typically has to wait a random back-off period and then again check whether the transmission medium is idle or occupied. For example, according to the current standard, the threshold is −82 dBm. The random back-off period provides a collision avoidance mechanism for multiple STAs that wish to transmit in the same BSS. In this case, the above contention-based channel access is commonly referred to as a distributed coordination function, DCF, in the IEEE 802.11 WLAN standard.

However, in many cases, there still exists STAs or APs that do not hear each other, e.g. the received signal power is too low, and will hence attempt to send their data simultaneously causing collisions at the receiver and hence data packet loss. To avoid this type of collisions, also commonly referred to as the hidden node problem, a medium access protocol comprising Request-to-Send, RTS, transmissions and Clear-to-Send, CTS, transmission has been proposed in the IEEE 802.11 WLAN standard. This RTS/CTS medium access protocol is illustrated in FIG. 1.

According to the RTS/CTS medium access protocol in FIG. 1, a transmitter, TX, in a BSS having data to transmit, e.g. a STA or an AP, will first send an RTS message to the intended receiver, RX, of the data in the BSS, e.g. an AP or a STA, in a first time slot. In response to the RTS message, the RX sends a Clear-to-Send, CTS, message back to the TX in a subsequent time slot. Upon receiving the CTS message, the TX may transmit its data to the RX in a following time slot, which data transmission then may be acknowledged or not by the RX. The RTS/CTS message may follow a Distributed Inter-Frame Space, DIFS, or Short Inter-Frame Space, SIFS, of the time slots. All other STAs or APs in the BSS that are able to receive or hear the RTS message from the TX will respond by setting their Network Allocation Vector, NAV, to defer its transmissions. This may be performed based on a duration field encoded in the RTS message which may indicate for how long time the NAV should be set for. The CTS message also comprises similar timing information to set the NAV, whereby all other STAs or APs in the BSS that receives or hears the CTS message will respond by doing so. The main purpose of the RTS/CTS message exchange, as described above with reference to FIG. 1, is to avoid collisions in a BSS, i.e. avoid multiple data packets at the same time being addressed to the same receiver over the same subcarriers.

Furthermore, to even further avoid collisions and/or interference in wireless communications networks comprising more than one BSS, different frequencies, subcarriers or channels, should be assigned to neighbouring or nearby BSSs. However, in dense deployment scenarios, it is likely that frequencies or channels will be reused even for neighbouring or nearby BSSs. In this case, resulting collisions and/or co-channel interference between the BSSs is expected to compromise the performance or Quality-of-Service, QoS, offered to the STAs by the BSSs. In particular, STAs that are located within an overlapping coverage area of the BSSs may, due to relatively strong interference, be more severely affected. In the IEEE 802.11 WLAN standard, this is commonly referred to as having Overlapping Basic Service Sets, OBSSs.

Although the RTS/CTS medium access protocol as described above with reference to FIG. 1 is useful, it will also affect other STAs or APs in other BSSs in case the BSS forms a part of an OBSS. If the OBSS is dense or closely spaced, these other STAs or APs will also set their NAV in the same way as the STAs and APs in the BSS even though they are operated independently of each other.

In such dense environments, the RTS/CTS medium access protocol may cause problems for the other STAs and APs in the other BSSs of the OBSS. Once a TX sends out an RTS message to an RX in a BSS, nearby STAs and APs that receives or hears the RTS message will consequently set their NAV. This will happen even if a STA or AP is not in the BSS, but close enough to receive or hear the RTS/CTS message exchange. The RTS/CTS messages are usually transmitted with the lowest Modulation and Coding Scheme, MCS.

However, in some circumstances, data transmissions from other STAs or APs in the OBSS will not interfere with the data transmission following the CTS message in the BSS. Hence, by blocking such data transmissions in the above described manner, the spatial reuse potential of the wireless communication network is reduced, especially in dense deployment environments.

SUMMARY

It is an object of embodiments herein to improve transmissions in a wireless communications network.

According to a first aspect of embodiments herein, the object is achieved by a method performed by a first station for handling Request-to-Send/Clear-to-Send, RTS/CTS, transmissions in a wireless communications network, wherein the first station is served by a first access point in a first Basic Service Set, BSS. The first station receives a RTS/CTS transmission relating to a second BSS. Then, the first station determines whether or not to set a Network Allocation Vector, NAV, according to the RTS/CTS transmission based on whether the RTS/CTS transmission was sent from a second station or from a second access point in the second BSS.

According to a second aspect of embodiments herein, the object is achieved by a first station for handling RTS/CTS transmissions in a wireless communications network, wherein the first station is served by a first access point in a first BSS. The first station is configured to receive a RTS/CTS transmission relating to a second BSS. The first station is also configured to determine whether or not to set a NAV according to the RTS/CTS transmission based on whether the RTS/CTS transmission was sent from a second station or from a second access point in the second BSS.

According to a third aspect of embodiments herein, the object is achieved by a method performed by a first access point for handling RTS/CTS transmissions in a wireless communications network, wherein the first access point serves at least a first station in a first BSS. The first access point receives a RTS/CTS transmissions transmission relating to a second BSS. Then, the first access point determines whether or not to set a NAV according to the RTS/CTS transmission based on whether the RTS/CTS transmission was sent from a second station or from a second access point in the second BSS.

According to a fourth aspect of embodiments herein, the object is achieved by a first access point for handling RTS/CTS transmissions in a wireless communications network, wherein the first access point serves at least a first station in a first BSS. The first access point is configured to receive a RTS/CTS transmission relating to a second BSS. The first access point is also configured to determine whether or not to set a NAV according to the RTS/CTS transmission based on whether the RTS/CTS transmission was sent from a second station or from a second access point in the second BSS.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By determining whether or not to set their NAV based on whether a RTS/CTS transmission from another BSS was sent from a station or an access point, i.e. based on the type of the transmitter in the other BSS that is transmitting the RTS/CTS transmission, the first station and the first access point are able to synchronize its data transmissions with data transmissions in the other BSS. This allows the first station and first access point to go ahead with data transmissions that are conventionally not transmitted, since they know that these will not interfere with data transmissions following CTS messages in other BSSs. Thus, the spatial reuse of the wireless communication network is increased, which will lead to an increase in system capacity. This will also lead to a reduced latency for data packet transmissions and increased system throughput.

Hence, transmissions in a wireless communications network are improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 3 is a flowchart depicting embodiments of a method in a station, FIG. 4 is a flowchart depicting embodiments of a method in an access point, FIG. 5 is a signaling scheme illustrating embodiments of a station and an access point, FIG. 6 is another signaling scheme illustrating embodiments of a station and an access point, FIG. 7 is a further signaling scheme illustrating embodiments of a station and an access point, FIG. 8 is another further signaling scheme illustrating embodiments of a station and an access point.

DETAILED DESCRIPTION

Figure 1:
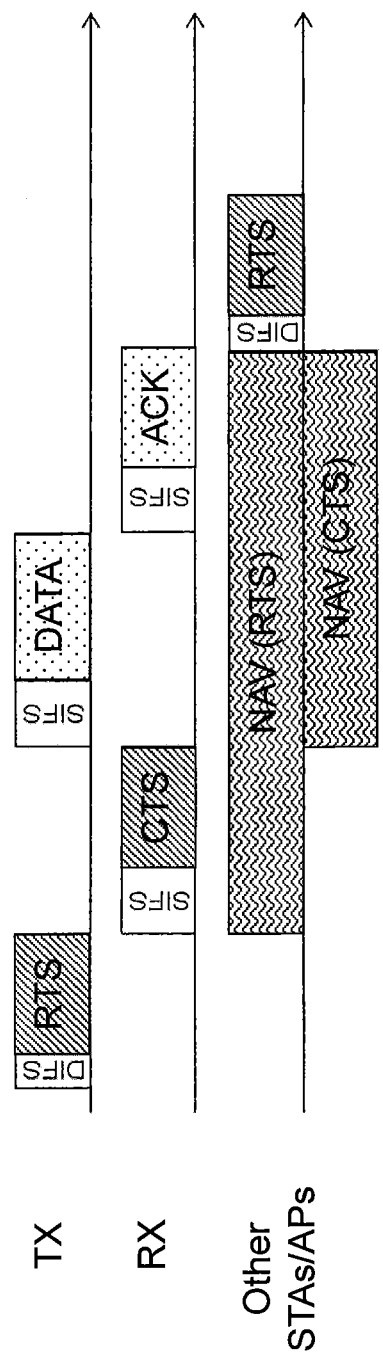
FIG. 1 is a signaling scheme illustrating a RTS/CTS medium access protocol in a wireless communications network.

The figures are schematic and simplified for clarity, and they merely show details which are essential to the understanding of the embodiments presented herein, while other details have been left out. Throughout, the same reference numerals are used for identical or corresponding parts or steps.

Figure 2:
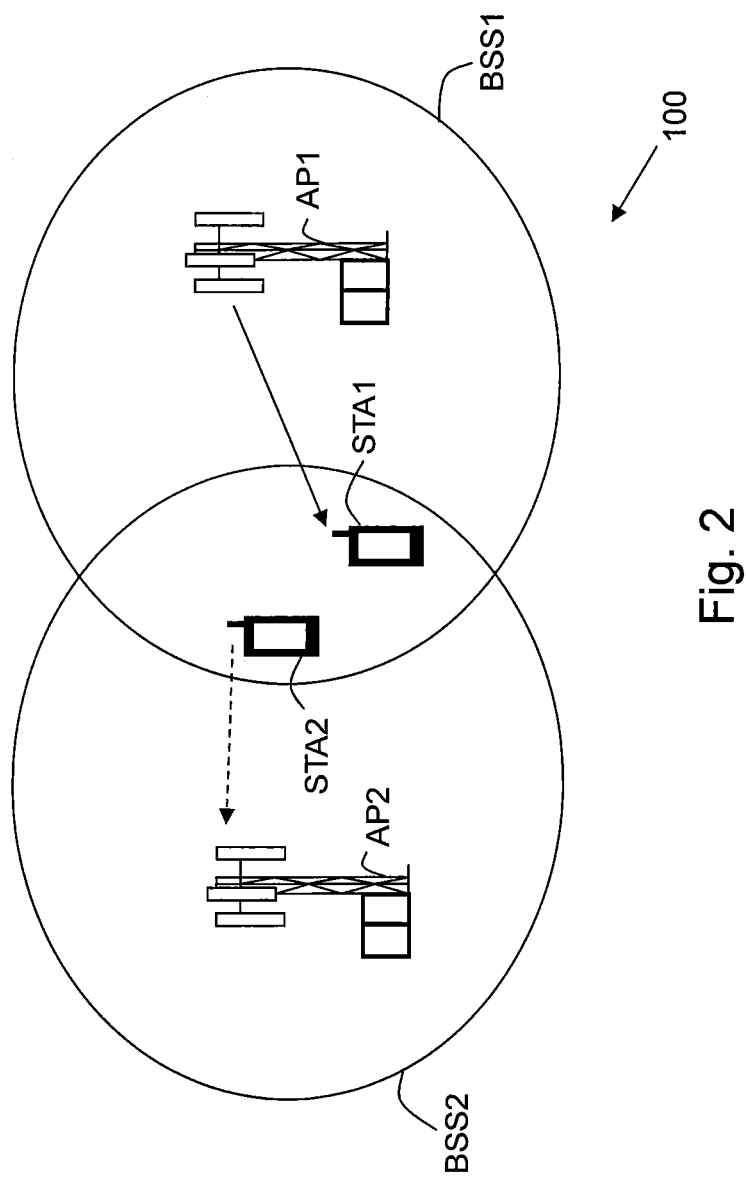
FIG. 2 is a schematic block diagram illustrating embodiments of a network node and a wireless device in a wireless communications network.

FIG. 2 shows an example of a wireless communications network 100 in which embodiments herein may be implemented. The wireless communications network 100 illustrated in FIG. 2 may be any wireless communications network using contention-based transmission resources of the same frequency, such as, e.g. a standardized IEEE 802.11 WLAN. The wireless communications network 100 may comprise a first and a second access point, AP1 and AP2. The first and second access points AP1 and AP2 may serve stations or wireless communication devices located within their respective coverage area or cell.

In the example scenario shown in FIG. 2, a first station STA1 is located in the coverage area or cell of the first access point AP1 and is being served by the first access point AP1. Furthermore, a second station STA2 is located in the coverage area or cell of the second access point AP2 and is being served by the second access point AP2. The first access point AP1 and the station STA1 may be said to comprise a first Basic Service Set, BSS1, while the second access point AP2 and the second station STA2 may be said to comprise a second Basic Service Set, BSS2. Note that since the Basic Service Sets BSS1 and BSS2 partly overlap each other and use the same frequency/channel, they may be commonly referred to as an Overlapping Basic Service Set, OBSS.

It should also be noted that, according to some embodiments, the wireless communications network 100 may also be a cellular or radio communication system using contention-based transmission resources of the same frequency. For example, cellular or radio communication systems operating in parts of the so-called unlicensed spectrum, i.e. unlicensed frequency bands which are shared, decentralized and not licensed to a particular type of scheduled wireless or radio communication. Examples of such wireless or radio communication systems may comprise LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system. In these embodiments, the first and second access points AP1 and AP2 may e.g. be an eNB, eNodeB, or a Home Node B, a Home eNode B, femto Base Station (BS), pico BS or any other network unit capable to serve a wireless device in the wireless communications network 100. The first and second access point AP1 and AP2 may also be e.g. a radio base station, a base station controller, a network controller, a relay node, a repeater, a Ultra-Dense Network/Software-Defined Network (UDN/SDN) radio access node, a Remote Radio Unit (RRU) or a Remote Radio Head (RRH).

Furthermore, in some embodiments, the first and second station STA1 and STA2 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, D2D capability, a wireless device with D2D capability, a Customer-Premises Equipment (CPE), a Laptop-Mounted Equipment (LME), a Laptop-Embedded Equipment (LEE), etc.

Furthermore, although embodiments below are described with reference to FIG. 4, this should not be construed as limiting to the embodiments herein, but merely as an example made for illustrative purposes.

As part of developing the embodiments herein, it was noticed that simply ignoring all RTS/CTS transmissions from another BSS is not a particularly advantageous solution to the hidden node problem. For example, when two overlapping BSSs, such as, e.g. BSS1 and BSS2 in FIG. 2, operate close to each other using contention-based transmission resources of the same frequency, the interference caused by a station transmitting on the uplink, UL, in the overlapping coverage area (e.g. STA2 as shown by the dotted arrow in FIG. 2) to another closely located station which is receiving on the downlink, DL, in the overlapping area (e.g. STA1 as shown by the fully drawn arrow in FIG. 2) may be so high that this interference will result in lost data packets for the receiving station.

In accordance with embodiments described herein, this issue is addressed by synchronising the UL and DL transmissions such that no simultaneous UL and DL transmissions can occur in the two neighbouring BSSs. To synchronise the UL and DL transmissions, a modified RTS/CTS procedure is proposed herein.

In other words, by determining whether or not to set the NAV in a first station STA1 and a first access point AP1 in the BSS1 based on whether the RTS/CTS transmission from the BSS2 was sent from the second station STA2 or from the second access point AP2, the first station STA1 and first access point AP1 are able to synchronize its data transmissions in BSS1 with data transmissions occurring in BSS2. This allows the first station STA1 and first access point AP1 to go ahead with data transmissions that are conventionally not transmitted, since the first station STA1 and first access point AP1 know that these data transmissions will not interfere with data transmissions following the CTS messages in BSS2. Hence, transmissions in the wireless communications network 100 will be improved.

Example of embodiments of a method performed by a first station STA1 for handling Request-to-Send/Clear-to-Send, RTS/CTS, transmissions in a wireless communications network 100, will now be described with reference to the flowchart depicted in FIG. 3. The first station STA1 is served by a first access point AP1 in a first Basic Service Set BSS1. FIG. 3 illustrates an example of actions or operations which may be taken by the first station STA1. The method comprises the following actions.

Action 301

The first station STA1 receives a RTS/CTS transmission relating to a second Basic Service Set BSS2. For example, in the scenario of FIG. 1, this means that the first station STA1 in the first Basic Service Set BSS1, which e.g. may be located in the overlapping coverage of the first and second Basic Service Sets BSS1 and BSS2, is close enough to hear/receive an RTS/CTS transmission in the second Basic Service Set BSS2, e.g. either from the second station STA2 to the second access point AP2 or from the second access point AP2 to the second station STA2.

There are different ways of enabling the first station STA1 to identify that the RTS/CTS transmission actually relates to the second Basic Service Set BSS2. In some embodiments, the colour bit introduced in the IEEE 802.11 WLAN standards by the 802.11 ah task group may be used to in the RTS/CTS transmissions to identify which BSS the RTS transmission belongs to. For example, a colour bit may be assigned to each BSS in the wireless communication network 100. The first station STA1 may then, upon receiving a RTS transmission, check the colour bit in the PHY preamble in the RTS/CTS transmission in order to determine whether the RTS/CTS transmission is in its own BSS, i.e. first Basic Service Set BSS1, or in another BSS, e.g. second Basic Service Set BSS2.

Alternatively, in some embodiments, a Partial ID (PAID) field may read out by the first station STA1 from a SIGNAL field of a VHT preamble of the RTS/CTS transmission, as defined in Section 22.3.8.3.3 in the IEEE WLAN 802.11ac-2013 standard. Based on the value of this PAID field, the first station STA1 may calculate a bitwise part of the BSS-ID. Then, the first station STA1 may compare this bitwise part of the calculated BSS-ID to its own BSS-ID value and conclude if the RTS/CTS transmission belongs to its own BSS, i.e. first Basic Service Set BSS1, or to another BSS, e.g. second Basic Service Set BSS2.

Action 302

After receiving the first RTS/CTS transmission as described in Action 301, the first station STA1 determines whether or not to set a Network Allocation Vector, NAV, according to the RTS/CTS transmission based on whether the RTS/CTS transmission was sent from a second station STA2 or from a second access point AP2 in the second Basic Service Set BSS2. This means that the first station STA1 is able to set its NAV based on the type of transmitter that is transmitting the RTS/CTS transmission in the second Basic Service Set BSS2, i.e. based on whether the first RTS transmission was sent from the second station STA2 to the second access point AP2 or from the second access point AP2 to the second station STA2. Thus, the first station STA1 is able to synchronize its transmissions in the first Basic Service Set BSS1 with the transmissions in the second Basic Service Set BSS2 such that, for example, data packet loss due to the co-channel interference is reduced or mitigated.

There are different ways of enabling the first station STA1 to distinguish if a RTS/CTS transmission received from another Basic Service Set, such as, Basic Service Set BSS2, originates from a station STA, e.g. second station STA2, or from an access point AP, e.g. second access point AP2.

In some embodiments, the first station STA1 may read out a Partial ID (PAID) field from a SIG A1 field of a VHT preamble of the RTS/CTS transmission, as defined in Section 22.3.8.2.3 in the IEEE WLAN 802.11ac standard. This is because when a second station STA2 transmits to a second access point AP2 in the Basic Service Set BSS2, the value of the PAID field will comprise a bitwise part of the BSS-ID of the second access point AP2; and, on the contrary, when a second access point AP2 transmits to a second station STA2 in the Basic Service Set BSS2, the value of the PAID field will be a combination of the association identity (AID) of the second station STA2 and the BSS-ID of the second access point AP2. Hence, the first station STA1 may determine from the value of the PAID field whether the RTS/CTS transmission originated from a station or an access point in the other Basic Service Set. Furthermore, in some embodiments, the first STA1 may also by listening to periodic beacons transmitted from different APs in the wireless communications network 100 create a list of the BSS-IDs that are present in the wireless communications network 100. Thus, according to one example, when the first STA1 reads out the value of a PAID field of a RTS/CTS transmission, the first station STA1 may perform the identification of the type of transmitter, i.e. AP or STA, from which the RTS/CTS transmission originated by using the following equations, Eq. 1-2:

$$PAID_k \in L_{BSSID} \rightarrow k \in AP, \quad (Eq. 1)$$

$$otherwise \rightarrow k \in STA. \quad (Eq. 2)$$

Here, $L_{BSSSID}$ may be a list of the bitwise parts of the occurring BSS-IDs.

In some embodiments, the type of transmitter from which the RTS/CTS transmission originated may also be detected by reading out a GROUP-ID field available in a SIG A1 field of a VHT preamble of the RTS/CTS transmission. This is because the GROUP ID is set to "0" when the second station STA2 transmits to the second access point AP2 in the Basic Service Set BSS2, and "63" when the second access point AP2 transmits to the second station STA2 in the Basic Service Set BSS2. Hence, the first station STA1 may determine from the value of the GROUP ID field whether the RTS/CTS transmission originated from a station or an access point in the other Basic Service Set.

It should also be noted that other ways of determining the type of transmitter from which a RTS/CTS transmission originates may also be envisioned, for example, by using and reading out other data fields available in the standard today or other data fields that will be made available in later releases or versions of the standard.

In some embodiments, the first station STA1 may determine not to set a NAV according to the RTS/CTS transmission when the RTS/CTS transmission is an RTS transmission sent from the second station STA2 or an CTS transmission sent from the second access point AP2. In this case, according to some embodiments, the first station STA1 may also determine to set a NAV according to the RTS/CTS transmission when the RTS/CTS transmission is an RTS transmission sent from the second access point AP2 or a CTS transmission sent from the second station STA2. This scenario is exemplified and discussed further with regards to FIGS. 5-6 below.

In some embodiments, the first station STA1 may determine not to set a NAV according to the RTS/CTS transmission when the RTS/CTS transmission is an RTS transmission sent from the second station STA2 and a measured signal power of the RTS transmission is below a first determined threshold value, or when the RTS/CTS transmission is an CTS transmission sent from the second access point AP2. In this case, according to some embodiments, the first station STA1 may also, when the measured signal power of the RTS transmission from the second station STA2 is above a first determined threshold value, determine not to set a NAV according to the RTS transmission and transmit, in response to receiving another RTS transmission from the first access point AP1, information indicating an upcoming occurrence of a nearby uplink transmission in another CTS transmission to the first access point AP1. Alternatively, in some embodiments, when the measured signal power of the RTS transmission from the second station STA2 is above a first determined threshold value, the first station STA1 may determine not to set a NAV according to the RTS transmission and transmit, in response to receiving another RTS transmission from the first access point AP1, information indicating that the first access point AP1 is not clear to send data to the first station STA1 in another CTS transmission to the first access point AP1. According to yet another alternative, in some embodiments, when the measured signal power of the RTS transmission from the second station STA2 is above a first determined threshold value, the first station STA1 may ignore any received RTS transmissions from the first access point AP1 for a time period indicated by the RTS transmission from the second station STA2. These different scenarios are exemplified and discussed further with regards to FIG. 7 below.

In some embodiments, the first station STA1 may determine not to set a NAV according to the RTS/CTS transmission when the RTS/CTS transmission is an RTS transmission sent from the second access point AP2, or when the RTS/CTS transmission is a CTS transmission sent from the second station STA2 and a measured signal power of the CTS transmission is below a second determined threshold value. In this case, according to some embodiments, the first station STA1 may also determine to set a NAV according to the RTS/CTS transmission when the RTS/CTS transmission is a CTS transmission sent from the second station STA2 and a measured signal power of the CTS transmission is above the second determined threshold value. These different scenarios are exemplified and discussed further with regards to FIG. 8 below.

Example of embodiments of a method performed by a first access point AP1 for handling Request-to-Send/Clear-to-Send, RTS/CTS, transmissions in a wireless communications network 100, will now be described with reference to the flowchart depicted in FIG. 4. The first access point AP1 serves at least a first station STA1 in a first Basic Service Set BSS1. FIG. 4 illustrates an example of actions or operations which may be taken by the first access point AP1. The method comprises the following actions.

Action 401

The first access point AP1 receives a RTS/CTS transmission relating to a second Basic Service Set BSS2. For example, in the scenario of FIG. 1, this means that the first access point AP1 in the first Basic Service Set BSS1 is close enough to hear or receive an RTS/CTS transmission in the second Basic Service Set BSS2, e.g. either from the second station STA2 to the second access point AP2 or from the second access point AP2 to the second station STA2.

As described above in Action 301 for the first station STA1, similar ways of enabling the first access point AP1 to identify that the RTS/CTS transmission actually relates to the second Basic Service Set BSS2 may be implemented in the first access point AP1.

Action 402

After receiving the RTS/CTS transmission as described in Action 401, the first access point AP1 determines whether or not to set a Network Allocation Vector, NAV, according to the RTS/CTS transmission based on whether the RTS/CTS transmission was sent from a second station STA2 or from a second access point AP2 in the second Basic Service Set BSS2. This means that first access point AP1 is able to set its NAV based on the type of transmitter that is transmitting the RTS/CTS transmission in the second Basic Service Set BSS2, i.e. based on whether the RTS/CTS transmission was sent from the second station STA2 to the second access point AP2 or from the second access point AP2 to the second station STA2. Thus, the first access point AP1 is able to synchronize its transmissions in the first Basic Service Set BSS1 with the transmissions in the second Basic Service Set BSS2 such that, for example, data packet loss due to the co-channel interference is reduced or mitigated.

As described above in Action 302 for the first station STA1, similar ways of enabling the first access point AP1 to distinguish if a received RTS/CTS transmission from another Basic Service Set originates from a station STA or from an access point AP may be implemented in the first access point AP1.

In some embodiments, the first access point AP1 may determine to set a NAV according to the RTS/CTS transmission when the RTS/CTS transmission is an RTS transmission sent from the second station STA2 or an CTS transmission sent from the second access point AP2. In this case, according to some embodiments, the first access point AP1 may also determine not to set a NAV according to the RTS/CTS transmission when the RTS/CTS transmission is an RTS transmission sent from the second access point AP2 or a CTS transmission sent from the second station STA2. This scenario is exemplified and discussed further with regards to FIGS. 5-6 below.

In some embodiments, the first access point AP1 may determine not to set a NAV according to the RTS/CTS transmission, but receive, in response to transmitting another RTS transmission to the first station STA1, information indicating an upcoming occurrence of a nearby uplink transmission in another CTS transmission from the first station STA1. In this case, according to some embodiments, the first access point AP1 may also set one or more transmission parameters of a subsequent data transmission to the first station STA1 based on the received information.

Alternatively, in some embodiments, the first access point AP1 may determine not to set a NAV according to the RTS/CTS transmission, but receive, in response to transmitting another RTS transmission to the first station STA1, information indicating that the first access point AP1 is not clear to send data to the first station STA1 in another CTS transmission from the first station STA1. In this case, according to some embodiments, the first access point AP1 may also determine to defer its data transmission according to the CTS transmission. These different scenarios are exemplified and discussed further with regards to FIG. 7 below.

FIGS. 5-6 shows examples of signaling schemes in different scenarios according to some embodiments of the first station STA1 and the first access point AP1.

In the scenario of FIG. 5, the second station STA2 has data to send to the second access point AP2 in the second Basic Service Set BSS2. Thus, the second station STA2 will start by sending an RTS message, i.e. performing an RTS transmission, to the second access point AP2 according to the RTS/CTS medium access protocol of the IEEE 802.11 WLAN standard. In this case, either one or both of the first station STA1 and the first access point AP1 in the first Basic Service Set BSS1 may hear/receive the RTS transmission from the second station STA2 to the second access point AP2 in the second Basic Service Set BSS2. This is shown by the dashed arrows in FIG. 5.

If the first station STA1 hears/receives the RTS transmission from the second station STA2 in the second Basic Service Set BSS2, the first station STA1 may ignore the RTS transmission, i.e. determine not the set a NAV according to the RTS transmission. However, if the first access point AP1 hears/receives the RTS transmission from the second station STA2 in the second Basic Service Set BSS2, the first access point AP1 may set its NAV according to the RTS transmission. Hence, no DL transmissions from the first access point to the first station STA1 will be performed while the UL transmissions from the second station STA2 to the second access point AP2 takes place. Hence, these UL and DL transmissions are synchronized. The same principle is here also applied by the first station STA1 and first access point AP1 in response to receiving a subsequent CTS transmission associated with the previously received RTS transmission from the second access point AP2 (shown by the dashed-dotted arrows in FIG. 5).

In the scenario of FIG. 6, the second access point AP2 has data to send to the second station STA2 in the second Basic Service Set BSS2. Thus, the second access point AP2 will start by sending an RTS message, i.e. performing an RTS transmission, to the second station STA2 according to the RTS/CTS medium access protocol of the IEEE 802.11 WLAN standard. In this case, either one or both of the first station STA1 and the first access point AP1 in the first Basic Service Set BSS1 may hear/receive the RTS transmission from the second access point AP2 to the second station STA2 in the second Basic Service Set BSS2. This is shown by the dashed arrows in FIG. 6.

If the first station STA1 hears/receives the RTS transmission from the second access point AP2 in the second Basic Service Set BSS2, the first station STA1 may set its NAV according to the RTS transmission. However, if the first access point AP1 hears/receives the RTS transmission from the second access point AP2 in the second Basic Service Set BSS2, the first access point AP1 may ignore the RTS transmission, i.e. determine not the set a NAV according to the RTS transmission. Hence, no UL transmissions from the first station STA1 to the first access point AP1 will be performed while the DL transmissions from the second access point AP2 to the second station STA2 takes place. Hence, these UL and DL transmissions are synchronized. The same principle is here also applied by the first station STA1 and first access point AP1 in response to receiving a subsequent CTS transmission associated with the previously received RTS transmission from the second station STA2 (shown by the dashed-dotted arrows in FIG. 6).

The above described procedures in FIGS. 5-6 for the first station STA1 and the first access point AP1 is summarized in the Table 1 below. Table 1 shows the type-based rules for the first station STA1 and the first access point AP1 after receiving a RTS/CTS transmission from a neighboring BSS (OBSS), e.g. BBS2.

TABLE 1

| Type receiving | RTS transmitter type | | CTS transmitter type | |
| --- | --- | --- | --- | --- |
| RTS/CTS | AP2 | STA2 | AP2 | STA2 |
| AP1 | Ignore | Set NAV | Set NAV | Ignore |
| STA1 | Set NAV | Ignore | Ignore | Set NAV |

FIGS. 7-8 shows further examples of signaling schemes in different scenarios according to some embodiments of the first station STA1 and the first access point AP1.

In the scenario of FIG. 7, the second station STA2 has data to send to the second access point AP2 in the second Basic Service Set BSS2. Thus, the second station STA2 will start by sending an RTS message, i.e. performing an RTS transmission, to the second access point AP2 according to the RTS/CTS medium access protocol of the IEEE 802.11 WLAN standard. In this case, either one or both of the first station STA1 and the first access point AP1 in the first Basic Service Set BSS1 may hear/receive the RTS transmission from the second station STA2 to the second access point AP2 in the second Basic Service Set BSS2. This is shown by the dashed arrows in FIG. 7.

If the first station STA1 hears/receives the RTS transmission from the second station STA2 in the second Basic Service Set BSS2, but the received signal strength or signal power of the RTS transmission is below a first determined threshold in the first station STA1, the first station STA1 may ignore the RTS transmission, i.e. determine not the set a NAV according to the RTS transmission. This is procedure is shown by the dashed area 701 in FIG. 7. This is advantageous since the received signal strength or signal power indicates that the interference caused by the transmissions from the second station STA2 to any received transmissions at the first station STA1 is small or insignificant, whereby the first station STA1 benefits from ignoring the RTS transmission since it may perform simultaneous DL reception without risking significant data packet loss.

On the other hand, if the first station STA1 hears/receives the RTS transmission from the second station STA2 in the second Basic Service Set BSS2 and the received signal strength or signal power of the RTS transmission is above a determined threshold in the first station STA1, the first station STA1 may note that an RTS transmission has been received and perform any of the following options in case a second RTS transmission, i.e. RTS2 in FIG. 7, is subsequently received from the first access point AP1:

- transmit a CTS transmission, i.e. CTS2 in FIG. 7, to the first access point AP1 in response to the second RTS transmission RTS2 in which the first station STA1 includes a warning that it has received the first RTS transmission from the second station STA2 in the second Basic Service Set BSS2. In this case, the first access point AP1 may then determine, based on the warning, whether to select a more robust MCS for its data transmission to the first station STA1 or to defer the data transmission to the first station STA1;
- transmit a negative CTS transmission, i.e. Negative CTS2 in FIG. 7, to the first access point AP1 in response to the second RTS transmission RTS2. In this way, the first station STA1 may inform the first access point AP1 that it should not transmit any data to the first station STA1; or
- ignore the second RTS transmission RTS2 from the first access point AP1.

In case the first access point AP1 selects a more robust MCS for its data transmission to the first station STA1, the first access point AP1 may then transmit the data to the first station STA1 using this more robust MCS.

The different procedures described above are shown by the dashed area 702 in FIG. 7. These are advantageous since they enables the first access point to be informed that the first station STA1 has received a RTS transmission from another BSS and that DL transmission to the first station STA1 may suffer from co-channel interference, it which case the first access point AP1 has the option to increase the robustness of its data transmission to the first stations STA1. Alternatively, the first access point AP1 is stopped from performing DL transmission to the first station STA1.

Here, if the first access point AP1 also hears/receives the RTS transmission from the second station STA2 in the second Basic Service Set BSS2, the first access point AP1 may ignore the RTS transmission, i.e. determine not the set a NAV according to the RTS transmission. In response to receiving a subsequent CTS transmission associated with the previously received RTS transmission from the second access point AP2 (shown by the dashed-dotted arrows in FIG. 5), the first station STA1 and first access point AP1 may also here ignore the CTS transmission, i.e. determine not the set a NAV according to the CTS transmission.

In the scenario of FIG. 8, the second access point AP2 has data to send to the second station STA2 in the second Basic Service Set BSS2. Thus, the second access point AP2 will start by sending an RTS message, i.e. performing an RTS transmission, to the second station STA2 according to the RTS/CTS medium access protocol of the IEEE 802.11 WLAN standard. In this case, either one or both of the first station STA1 and the first access point AP1 in the first Basic Service Set BSS1 may hear/receive the RTS transmission from the second access point AP2 to the second station STA2 in the second Basic Service Set BSS2. This is shown by the dashed arrows in FIG. 8.

Here, both the first station STA1 and the first access point AP1 will ignore the RTS transmission, i.e. determine not the set a NAV according to the RTS transmission, if they hear/receive the RTS transmission from the second access point AP2 in the second Basic Service Set BSS2.

Furthermore, the first access point AP1 will also ignore a subsequent CTS transmission associated with the previously received RTS transmission from the second access point AP2 (shown by the dashed-dotted arrows in FIG. 5), i.e. determine not the set a NAV according to the CTS transmission. The first station STA1 may, on the other hand, if it hears/receives the subsequent CTS transmission associated with the previously received RTS transmission from the second access point AP2, determine if the received signal strength or power of the subsequent CTS transmission is above a second determined threshold in the first station STA1.

If the subsequent CTS transmission is below the second determined threshold in the first station STA1, the first station STA1 may ignore the CTS transmission, i.e. determine not to set a NAV in response to the CTS transmission. This is procedure is shown by the dashed area 801 in FIG. 8. However, if the subsequent CTS transmission is above the second determined threshold in the first station STA1, the first station STA1 may set its NAV according to the CTS transmission. This is procedure is shown by the dashed area 802 in FIG. 8. This is advantageous in that it ensures that no UL transmission from the first station STA1 will cause interference and possibly failed data packet reception in the DL transmission from the second access point AP2 to the second station STA2 in the second Basic Service Set BSS2.

Figure 9:
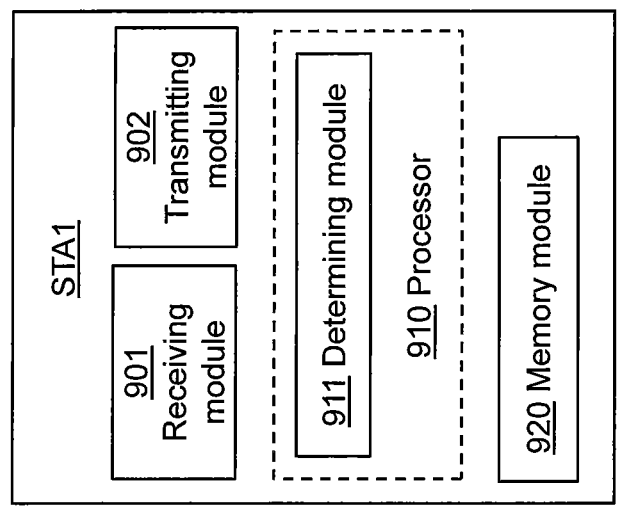
FIG. 9 is a schematic block diagram depicting embodiments of a station.

To perform the method actions for handling Request-to-Send/Clear-to-Send, RTS/CTS, transmissions in a wireless communications network 100, the first station STA1 may comprise the following arrangement depicted in FIG. 9. The first station STA1 is served by a first access point AP1 in a first Basic Service Set BSS1.

FIG. 9 shows a schematic block diagram of embodiments of the first station STA1. In some embodiments, the first station STA1 may comprise a receiving module 901, a transmitting module 902, and a processor 910. The receiving module 901 also referred to herein as a receiver or receiving unit, may be used to receive signals from a first access point AP1 in the wireless communications network 100. The transmitting module 902 also referred to herein as transmitter or transmitting unit, may be used to transmit signals to a first access point AP1 in the wireless communications network 100. The receiving module 901 and transmitting module 902 may also be combined in a transceiving module or transceiver. The processor 910 may also be referred to herein as processing module, processing unit or processing circuitry, may control the operation of the first station STA1. The processor 910 may also control the receiver 901 and the transmitter 902. Optionally, the processor 910 may comprise one or more of the receiver 901 and the transmitter 902, and/or perform the function thereof. The processor 910 may also comprise a determining module 911 capable of determining whether or not to set a NAV of the first station STA1.

The first station STA1 is configured to receive a RTS/CTS transmission relating to a second Basic Service Set BSS2, and determine whether or not to set a Network Allocation Vector, NAV, according to the RTS/CTS transmission based on whether the RTS/CTS transmission was sent from a second station STA2 or from a second access point AP2 in the second Basic Service Set BSS2.

In some embodiments, the first station STA1 may be further configured to determine not to set a NAV according to the RTS/CTS transmission when the RTS/CTS transmission is an RTS transmission sent from the second station STA2 or an CTS transmission sent from the second access point AP2, and to determine to set a NAV according to the RTS/CTS transmission when the RTS/CTS transmission is an RTS transmission sent from the second access point AP2 or a CTS transmission sent from the second station STA2.

In some embodiments, the first station STA1 may be further configured to determine not to set a NAV according to the RTS/CTS transmission when the RTS/CTS transmission is an RTS transmission sent from the second station STA2 and a measured signal power of the RTS transmission is below a first determined threshold value, or when the RTS/CTS transmission is an CTS transmission sent from the second access point AP2.

In some embodiments, the first station STA1 may be further configured to, when the measured signal power of the RTS transmission from the second station STA2 is above a first determined threshold value, determine not to set a NAV according to the RTS transmission and further perform one of: transmitting, in response to receiving another RTS transmission from the first access point AP1, information indicating an upcoming occurrence of a nearby uplink transmission in a CTS transmission to the first access point AP1; transmitting, in response to receiving another RTS transmission from the first access point AP1, information indicating that the first access point AP1 is not clear to send data to the first station STA1 in a CTS transmission to the first access point AP1; or ignoring any received RTS transmissions from the first access point AP1 for a time period indicated by the RTS transmission from the second station STA2.

In some embodiments, the first station STA1 may be further configured to determine not to set a NAV according to the RTS/CTS transmission when the RTS/CTS transmission is an RTS transmission sent from the second access point AP2, or when the RTS/CTS transmission is a CTS transmission sent from the second station STA2 and a measured signal power of the CTS transmission is below a second determined threshold value, and to determine to set a NAV according to the RTS/CTS transmission when the RTS/CTS transmission is a CTS transmission sent from the second station STA2 and a measured signal power of the CTS transmission is above the second determined threshold value.

The embodiments for handling Request-to-Send/Clear-to-Send, RTS/CTS, transmissions in a wireless communications network 100 may be implemented through one or more processors, such as, e.g. the processor 910 in the first station STA1 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processor 910 in the first station STA1. The computer program code may e.g. be provided as pure program code in the first station STA1 or on a server and downloaded to the first station STA1. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first station STA1 may further comprise a memory 920, which may be referred to or comprise one or more memory modules or units. The memory 920 may be arranged to be used to store executable instructions and data to perform the methods described herein when being executed in or by the processor 910 of the first station STA1. Those skilled in the art will also appreciate that the processor 910 and the memory 920 described above may refer to a combination of analog and digital circuits, and/or one or more processors configured with software and/or firmware, e.g. stored in the memory 920, that when executed by the one or more processors, such as, the processor 910, cause the one or more processors to perform the method as described above. The processor 910 and the memory 920 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 910, cause the at least one processor to carry out the method for handling Request-to-Send/Clear-to-Send, RTS/CTS, transmissions in a wireless communications network 100. Also, some embodiments may further comprise a carrier containing said computer program product, wherein the carrier is one of an electronic signal, optical signal, radio signal, or computer-readable storage medium.

Furthermore, various exemplary embodiments of the first station STA1 may also be described according to the following examples.

According to one example, the first station STA1 may be a first station STA1 for handling Request-to-Send/Clear-to-Send, RTS/CTS, transmissions in a wireless communications network 100, wherein the first station STA1 is served by a first access point AP1 in a first Basic Service Set BSS1. The first station STA1 comprise a receiving module 901 for receiving a RTS/CTS transmission relating to a second Basic Service Set BSS2, and a determining module 911 for determining whether or not to set a Network Allocation Vector, NAV, according to the RTS/CTS transmission based on whether the RTS/CTS transmission was sent from a second station STA2 or from a second access point AP2 in the second Basic Service Set BSS2. Here, the modules of the first station STA1 may, in some embodiments, be implemented as computer programs stored in a memory, e.g. in the memory module 920, for execution by processor(s), e.g. the processing module 910.

According to another example, the first station STA1 may be a first station STA1 for handling Request-to-Send/Clear-to-Send, RTS/CTS, transmissions in a wireless communications network 100, wherein the first station STA1 is served by a first access point AP1 in a first Basic Service Set BSS1. The first station STA1 comprise a receiver 901, a processor 910 and a memory 920, said memory 920 containing instructions executable by said processor 910 whereby said first station STA1 is configured to receive a RTS/CTS transmission relating to a second Basic Service Set BSS2, and to determine whether or not to set a Network Allocation Vector, NAV, according to the RTS/CTS transmission based on whether the RTS/CTS transmission was sent from a second station STA2 or from a second access point AP2 in the second Basic Service Set BSS2.

Figure 10:
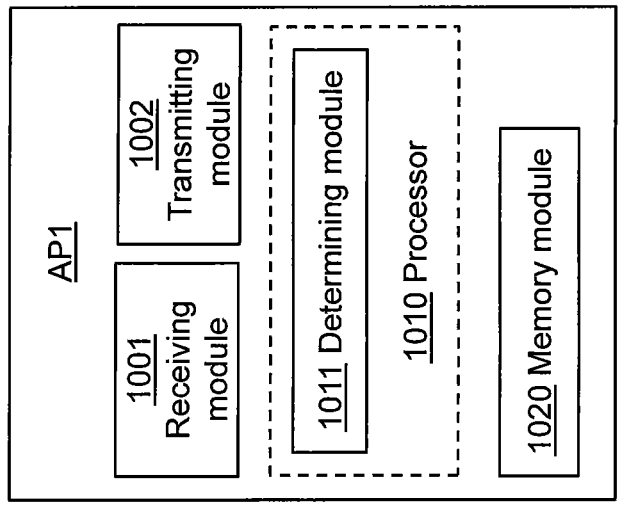
FIG. 10 is a schematic block diagram depicting embodiments of an access point.

To perform the method actions for handling Request-to-Send/Clear-to-Send, RTS/CTS, transmissions in a wireless communications network 100, the first access point AP1 may comprise the following arrangement depicted in FIG. 10. The first access point AP1 serves at least a first station STA1 in a first Basic Service Set BSS1.

FIG. 10 shows a schematic block diagram of embodiments of the first access point AP1. In some embodiments, the first access point AP1 may comprise a receiving module 1001, a transmitting module 1002, and a processor 1010. The receiving module 1001 also referred to herein as a receiver or receiving unit, may be used to receive signals from a first station STA1 in the wireless communications network 100. The transmitting module 1002 also referred to herein as transmitter or transmitting unit, may be used to transmit signals to a first station STA1 in the wireless communications network 100. The receiving module 1001 and the transmitting module 1002 may also be combined in a transceiving module or transceiver. The processor 1010 may also be referred to herein as processing module, processing unit or processing circuitry, may control the operation of the first access point AP1. The processor 1010 may also control the receiver 1001 and the transmitter 1002. Optionally, the processor 1010 may comprise one or more of the receiver 1001 and the transmitter 1002, and/or perform the function thereof. The processor 1010 may also comprise a determining module 1011 capable of determining whether or not to set a NAV of the first access point AP1.

The first access point AP1 is configured to receive a RTS/CTS transmission relating to a second Basic Service Set BSS2, and determine whether or not to set a Network Allocation Vector, NAV, according to the RTS/CTS transmission based on whether the RTS/CTS transmission was sent from a second station STA2 or from a second access point AP2 in the second Basic Service Set BSS2.

In some embodiments, the first access point AP1 may be further configured to determine to set a NAV according to the RTS/CTS transmission when the RTS/CTS transmission is an RTS transmission sent from the second station STA2 or an CTS transmission sent from the second access point AP2, and to determine not to set a NAV according to the RTS/CTS transmission when the RTS/CTS transmission is an RTS transmission sent from the second access point AP2 or a CTS transmission sent from the second station STA2.

In some embodiments, the first access point AP1 may be further configured to receive, in response to transmitting another RTS transmission to the first station STA1, information indicating an upcoming occurrence of a nearby uplink transmission in another CTS transmission from the first station STA1, and set one or more transmission parameters of a subsequent data transmission to the first station STA1 based on the received information. In some embodiments, the first access point AP1 may be further configured to receive, in response to transmitting another RTS transmission to the first station STA1, information indicating that the first access point AP1 is not clear to send data to the first station STA1 in another CTS transmission from the first station STA1.

The embodiments for handling Request-to-Send/Clear-to-Send, RTS/CTS, transmissions in a wireless communications network 100 may be implemented through one or more processors, such as, e.g. the processor 1010 in the first access point AP1 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processor 1010 in the first access point AP1. The computer program code may e.g. be provided as pure program code the first access point AP1 or on a server and downloaded to the first access point AP1. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first access point AP1 may further comprise a memory 1020, which may be referred to or comprise one or more memory modules or units. The memory 1020 may be arranged to be used to store executable instructions and data to perform the methods described herein when being executed in or by the processor 1010 of the first access point AP1. Those skilled in the art will also appreciate that the processor 1010 and the memory 1020 described above may refer to a combination of analog and digital circuits, and/or one or more processors configured with software and/or firmware, e.g. stored in the memory 1020, that when executed by the one or more processors, such as, the processor 1010, cause the one or more processors to perform the method as described above. The processor 1010 and the memory 1020 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 1010, cause the at least one processor to carry out the method for enabling channel estimation in a wireless communications network 100. Also, some embodiments may further comprise a carrier containing said computer program product, wherein the carrier is one of an electronic signal, optical signal, radio signal, or computer-readable storage medium.

Furthermore, various exemplary embodiments of the first access point AP1 may also be described according to the following examples.

According to one example, the first access point AP1 may be a first access point AP1 for handling Request-to-Send, RTS, transmissions in a wireless communications network 100, wherein the first access point AP1 serves at least a first station STA1 in a first Basic Service Set BSS1. The first access point AP1 comprise a receiving module 1001 for receiving a RTS/CTS transmission relating to a second Basic Service Set BSS2, and a determining module 1011 for determining whether or not to set a Network Allocation Vector, NAV, according to the RTS/CTS transmission based on whether the RTS/CTS transmission was sent from a second station STA2 or from a second access point AP2 in the second Basic Service Set BSS2. Here, the modules of the first access point AP1 may, in some embodiments, be implemented as computer programs stored in a memory, e.g. in the memory module 1020, for execution by processor(s), e.g. the processing module 1010.

According to another example, the first access point AP1 may be a first access point AP1 for handling Request-to-Send, RTS, transmissions in a wireless communications network 100, wherein the first access point AP1 serves at least a first station STA1 in a first Basic Service Set BSS1. The first access point AP1 comprise a receiver 1001, a processor 1010 and a memory 1020, said memory 1020 containing instructions executable by said processor 1010 whereby said first access point AP1 is configured to receive a RTS/CTS transmission relating to a second Basic Service Set BSS2, and to determine whether or not to set a Network Allocation Vector, NAV, according to the RTS/CTS transmission based on whether the RTS/CTS transmission was sent from a second station STA2 or from a second access point AP2 in the second Basic Service Set BSS2.

The terminology used in the detailed description of the particular embodiments illustrated in the accompanying drawings is not intended to be limiting of the first station STA1, the first access point AP1 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempligratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

AP Access Point
BSS Basic Service Set
CCA Channel Assessment
CTS Clear-to-Send
DCF Distributed Coordination Function
DIFS Distributed Inter-Frame Space
MCS Modulation and Coding Scheme
NAV Network Allocation Vector
OBSS Overlapping Basic Service Set
RTS Request-to-Send
SIFS Short Inter-Frame Space
STA Station

The invention claimed is:

1. A method performed by a first station for handling Request-to-Send/Clear-to-Send, RTS/CTS, transmissions in a wireless communications network, wherein the first station is served by a first access point in a first Basic Service Set, the method comprising:
   receiving an RTS/CTS transmission relating to a second Basic Service Set, the second basic service set comprising a second access point and a second station;
   determining whether the RTS/CTS transmission is an RTS transmission or a CTS transmission;
   determining whether the RTS/CTS transmission was sent from the second access point or the second station;
   determining not to set a Network Allocation Vector, NAV, according to the RTS/CTS transmission responsive to a determination that the RTS/CTS transmission is an RTS transmission sent from the second station or a CTS transmission sent from the second access point; and
   determining to set the NAV according to the RTS/CTS transmission responsive to a determination the RTS/CTS transmission is an RTS transmission sent from the second access point or a CTS transmission sent from the second station.

2. The method according to claim 1, further comprising:
   determining not to set a NAV according to the RTS/CTS transmission responsive to the RTS/CTS transmission being an RTS transmission sent from the second station and a measured signal power of the RTS transmission being below a first determined threshold value, or responsive to the RTS/CTS transmission being a CTS transmission sent from the second access point.

3. The method according to claim 2, further comprising, when the measured signal power of the RTS transmission from the second station is above a first determined threshold value, determining not to set a NAV according to the RTS transmission and further performing one of:

transmitting, in response to receiving another RTS transmission from the first access point, information indicating an upcoming occurrence of a nearby uplink transmission in another CTS transmission to the first access point;

transmitting, in response to receiving another RTS transmission from the first access point, information indicating that the first access point is not clear to send data to the first station in another CTS transmission to the first access point; or ignoring any received RTS transmissions from the first access point for a time period indicated by the RTS transmission from the second station.

4. The method according to claim 2, further comprising:
determining not to set a NAV according to the RTS/CTS transmission when the RTS/CTS transmission is an RTS transmission sent from the second access point, or when the RTS/CTS transmission is a CTS transmission sent from the second station and a measured signal power of the CTS transmission is below a second determined threshold value, and determining to set a NAV according to the RTS/CTS transmission when the RTS/CTS transmission is a CTS transmission sent from the second station and a measured signal power of the CTS transmission is above the second determined threshold value.

5. A computer program product comprising a non-transitory computer readable storage medium storing computer-executable instructions which, when executed on at least one processor, cause the at least one processor to carry out the method according to claim 1.

6. A first station for handling Request-to-Send/Clear-to-Send, RTS/CTS, transmissions in a wireless communications network, wherein the first station is served by a first access point in a first Basic Service Set, the first station is configured to perform operations comprising:
receiving an RTS/CTS transmission relating to a second Basic Service Set, the second basic service set comprising a second access point and a second station;
determining whether the RTS/CTS transmission is an RTS transmission or a CTS transmission;
determining whether the RTS/CTS transmission was sent from the second access point or the second station;
determining not to set a Network Allocation Vector, NAV, according to the RTS/CTS transmission responsive to a determination that the RTS/CTS transmission is an RTS transmission sent from the second station or a CTS transmission sent from the second access point; and
determining to set the NAV according to the RTS/CTS transmission responsive to a determination that the RTS/CTS transmission is an RTS transmission sent from the second access point or a CTS transmission sent from the second station.

7. The first station according to claim 6, further configured to determine not to set a NAV according to the RTS/CTS transmission responsive to the RTS/CTS transmission being an RTS transmission sent from the second station and a measured signal power of the RTS transmission is below a first determined threshold value, or responsive to the RTS/CTS transmission being a CTS transmission sent from the second access point.

8. The first station according to claim 7, further configured to, when the measured signal power of the RTS transmission from the second station is above a first determined threshold value, determine not to set a NAV according to the RTS transmission and further perform one of: transmitting, in response to receiving another RTS transmission from the first access point, information indicating an upcoming occurrence of a nearby uplink transmission in a CTS transmission to the first access point; transmitting, in response to receiving another RTS transmission from the first access point, information indicating that the first access point is not clear to send data to the first station in a CTS transmission to the first access point; or ignoring any received RTS transmissions from the first access point for a time period indicated by the RTS transmission from the second station.

9. The first station according to claim 7, further configured to determine not to set a NAV according to the RTS/CTS transmission when the RTS/CTS transmission is an RTS transmission sent from the second access point, or when the RTS/CTS transmission is a CTS transmission sent from the second station and a measured signal power of the CTS transmission is below a second determined threshold value, and to determine to set a NAV according to the RTS/CTS transmission when the RTS/CTS transmission is a CTS transmission sent from the second station and a measured signal power of the CTS transmission is above the second determined threshold value.

10. The first station according to claim 6, further comprising a processor and a memory, wherein the memory is containing instructions executable by the processor.

11. A method performed by a first access point for handling Request-to-Send/Clear-to-Send, RTS/CTS, transmissions in a wireless communications network, wherein the first access point serves at least a first station in a first Basic Service Set, the method comprising:
receiving an RTS/CTS transmission relating to a second Basic Service Set, the second basic service set comprising a second access point and a second station;
determining whether the RTS/CTS transmission is an RTS transmission or a CTS transmission;
determining whether the RTS/CTS transmission was sent from the second access point or the second station;
determining to set a Network Allocation Vector, NAV according to the RTS/CTS transmission responsive to a determination that the RTS/CTS transmission is an RTS transmission sent from the second station or a CTS transmission sent from the second access point; and
determining not to set the NAV according to the RTS/CTS transmission responsive a determination that to the RTS/CTS transmission is an RTS transmission sent from the second access point or a CTS transmission sent from the second station.

12. The method according to claim 11, further comprising receiving, in response to transmitting another RTS transmission to the first station, information indicating an upcoming occurrence of a nearby uplink transmission in another CTS transmission from the first station, and setting one or more transmission parameters of a subsequent data transmission to the first station based on the received information.

13. The method according to claim 11, further comprising receiving, in response to transmitting another RTS transmission to the first station, information indicating that the first access point is not clear to send data to the first station in another CTS transmission from the first station.

14. A first access point for handling Request-to-Send/Clear-to-Send, RTS/CTS, transmissions in a wireless communications network, wherein the first access point serves at least a first station in a first Basic Service Set, the first access point is configured to perform operations comprising:
receiving an RTS/CTS transmission relating to a second Basic Service Set, the second basic service set comprising a second access point and a second station;

determining whether the RTS/CTS transmission is an RTS transmission or a CTS transmission;

determining whether the RTS/CTS transmission was sent from the second access point or the second station;

determining not to set a Network Allocation Vector, NAV, according to the RTS/CTS transmission responsive to a determination that the RTS/CTS transmission is an RTS transmission sent from the second station or a CTS transmission sent from the second access point; and determining to set the NAV according to the RTS/CTS transmission responsive a determination that to the RTS/CTS transmission is an RTS transmission sent from the second access point or a CTS transmission sent from the second station.

15. The first access point according to claim 14, further configured to receive, in response to transmitting another RTS transmission to the first station, information indicating an upcoming occurrence of a nearby uplink transmission in another CTS transmission from the first station, and set one or more transmission parameters of a subsequent data transmission to the first station based on the received information.

16. The first access point according to claim 14, further configured to receive, in response to transmitting another RTS transmission to the first station, information indicating that the first access point is not clear to send data to the first station in another CTS transmission from the first station.

17. The first access point according to claim 14, further comprising a processor and a memory, wherein the memory is containing instructions executable by the processor.

\* \* \* \* \*